April 2, 1935.  F. A. WATKINS  1,996,313
MOISTENING DEVICE
Filed Nov. 27, 1933
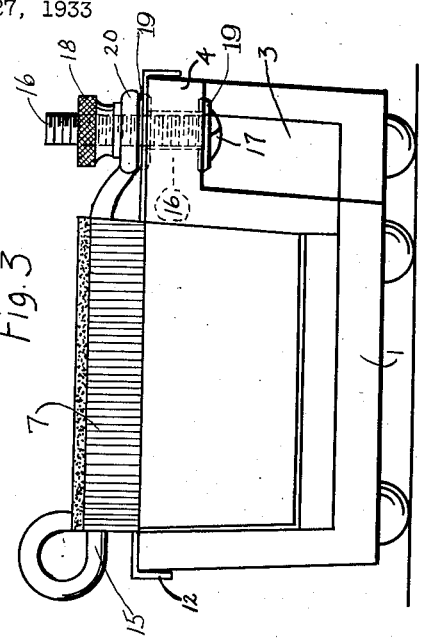
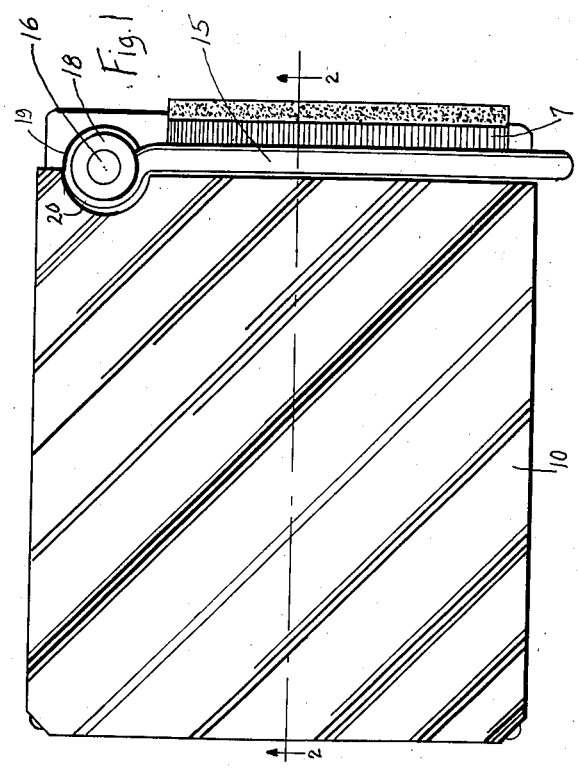
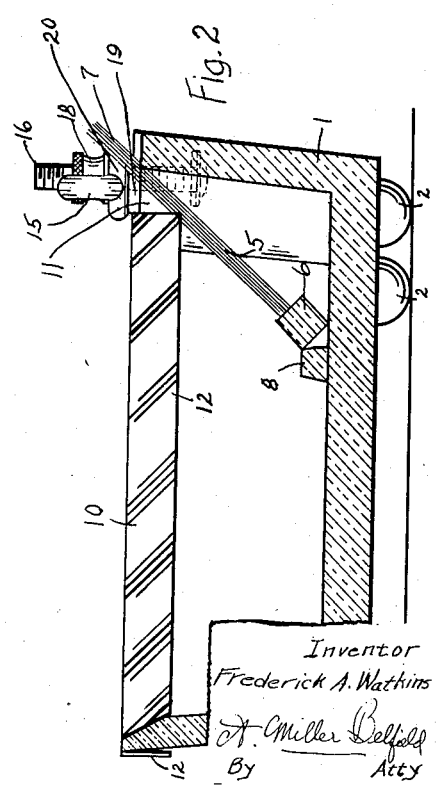
Inventor
Frederick A. Watkins
By A. Miller Belfield
Atty Patented Apr. 2, 1935

1,996,313

UNITED STATES PATENT OFFICE 1,996,313

MOISTENING DEVICE

Frederick A. Watkins, Highland Park, Ill.

Application November 27, 1933, Serial No. 699,857

7 Claims. (Cl. 91—38)

My invention relates to moistening devices, particularly such as may be used for moistening postage stamps, labels, envelopes or even the fingers.

One of the objects of the invention is to provide a simple, practical and advantageous form of moistening device.

Another object of the invention is to permit the devices to be readily adaptable and useful for accomplishing the various purposes above set forth and others.

Another object of the invention is to secure cleanliness and prevent dirt from accumulating in or upon the device and so prevent the objects which are moistened from becoming soiled.

Another object of the invention is to secure ready adjustment to permit graduation of the moistening effect.

Another object of the invention is to secure the foregoing and other desirable results in a simple and expeditious manner.

In the accompanying drawing—

Fig. 1 is a plan view of a moistening device embodying my invention;

Fig. 2 is a cross section of the same taken on line 2—2 in Fig. 1; and

Fig. 3 is an end elevation of the device.

Referring to the drawing, I show a moistening device comprising a bowl or tray 1 for holding the moistening liquid. This bowl or tray is preferably made of glass so that its interior may be readily seen, although other materials could of course be used. This bowl or tray is preferably rectangular in form, as best shown in Fig. 1. For supporting the bowl or tray conveniently and preventing noise and injury to the article, such as a desk, on which the device may be mounted, I preferably provide a plurality of pads or buttons 2 which are secured to the under side of the bowl or tray and serve as feet for the same. These feet are preferably made of rubber or like material to grip the surface on which the device rests and prevent slippage when in use. These feet are particularly useful when the device is made of glass.

This bowl or tray preferably has a cutaway corner 3 so as to provide an elevated overhang 4 whose purpose will be referred to later on.

A moistening member such as the brush 5 is shown arranged in the bowl or tray 1, as best shown in Fig. 2, being preferably arranged at an inclination with its lower end 6 at which the bristles are bound together mounted on the floor of the bowl or tray and its upper end 7 projecting above the top of the latter. The floor or bottom of the bowl or tray 1 is preferably provided with stops 8 desirably formed integral with the bowl or tray 1 to hold the brush 5 in its proper position. The brush 5 being more or less immersed in the moistening liquid or water in the bowl or tray will cause the brush to be moistened throughout its length, including its upper projecting operative end 7.

A cover 10 for the bowl or tray 1 is preferably provided and arranged to be mounted on top of the latter and to cover the entire bowl or tray excepting an end portion or space 11 which is left to permit the brush 5 to project. The cover 10 preferably has inclined side flanges 12 which extend a short distance down the sides or vertical walls of the bowl or tray, as best shown in Figs. 2 and 3. The front end of the top or cover 10, that is, the end nearest the space 11, is preferably not provided with any down flange. The presence of the other flanges 12, 12 permit the cover 10 to be held properly in position and at the same time permit it to be slid back and forth so as to more or less uncover the bowl or tray 1, to permit water or other liquid to be poured therein and for other purposes. In the use of the device this cover 10 is normally kept in position to close the tray or bowl as much as possible, as shown in Figs. 1 and 2.

An arm 15, preferably in the form of a wire or other metal piece, is mounted on the bowl 1 and arranged to be placed in position lengthwise of the brush 5 and close to its operative end 7, as shown in Figs. 1 and 2. This member 15 may serve as a guide for the envelope cover or paper or other article to be moistened, and is preferably mounted for swinging motion as by means of a screw 16 passing through the aforesaid overhang or shoulder 4 and having its end or head 17 below said overhang 4. A thumb nut 18 is mounted on the upper end of screw 16, so that it may be adjusted to tighten the guide or arm 15, washers 19 being preferably interposed between the loop 20 forming the end of guide wire 15 and the top of the bowl or tray 1, and between the head of screw 16 and the overhang 4. These washers 19 are preferably made of a material such as fiber, which will have a friction effect to hold the guide 15 in adjustment and also be compressible to prevent breaking glass. In this way, by adjusting the thumb nut 18, guide wire 15 may be loosened so as to permit it to be swung to any desired adjustment and then nut may be tightened so as to hold it in adjusted position. Thus adjustment may be secured for various purposes, to accommodate different articles or different thicknesses of articles, and so on. In Fig. 2 the arm 15 is shown at a slight distance from the end 7 of brush 5, so as to permit the cover of an envelope or other article to be moved by the guide 15 and brush end 7 to secure the proper moistening and the guide 15 may be adjusted to vary this space as desired. Preferably guide 15 is quite close to brush 7 and guide 15 is held firmly in position by a tightening thumb nut 18.

It will be understood that changes and modifications may be made without departing from the spirit of the invention.

What I claim is:

1. A device of the class specified having a bowl or tray for moistening fluid, a moistening member for arrangement in the bowl or tray with an end projecting for moistening purposes, and a guide arranged along the side of the moistening end of the brush and pivotally mounted for horizontal swinging movement at one end on the bowl or tray, said bowl or tray having a cut-away portion forming an overhang on which said guide is mounted.

2. A device of the class specified having a bowl or tray for moistening fluid, a moistening member for arrangement in the bowl or tray with an end projecting for moistening purposes, and a guide arranged along the side of the moistening end of the brush and pivotally mounted for horizontal swinging movement at one end on the bowl or tray, said bowl or tray having a cut-away portion forming an overhang on which said guide is mounted, said guide being pivotally mounted by means of a vertically arranged screw bolt having an adjusting nut.

3. A device of the class specified comprising a glass bowl or tray, a moistening member mounted therein and having a projecting end for moistening purposes, a metal cover arranged to slide on top of the bowl or tray and covering all of the same excepting the space where the brush projects, said cover being provided with downwardly extending side and back flanges to permit it to slide but to hold it in proper closed position, a guide having one end pivotally mounted at one corner of the bowl or tray and arranged to extend lengthwise of the projecting end of the brush, and to swing horizontally about its pivoted end, said guide being mounted on a screw bolt provided with an adjusting nut to permit movement and adjustment of said guide.

4. A device of the class specified comprising a glass bowl or tray, a moistening member mounted therein and having a projecting end for moistening purposes, a metal cover arranged to slide on top of the bowl or tray and covering all of the same excepting the space where the brush projects, a horizontally swinging guide pivotally mounted at one corner of the bowl or tray and arranged to extend lengthwise of the projecting end of the brush, said guide being mounted on a vertical screw bolt extending through a horizontal wall portion of the bowl, provided with an adjusting nut to permit movement and adjustment of said guide, and seats of compressible friction material between the opposite ends of the screw bolt and the upper and lower sides of said bowl wall portion.

5. A device of the class specified comprising a glass bowl or tray, a moistening member mounted therein and having a projecting end for moistening purposes, a metal cover arranged to slide on top of the bowl or tray and covering all of the same excepting the space where the brush projects, a horizontally swinging guide pivotally mounted at one corner of the bowl or tray and arranged to extend lengthwise of the projecting end of the brush, said guide being mounted on a vertical screw bolt provided with an adjusting nut to permit movement and adjustment of said guide, and washers of compressible friction material on the opposite ends of the screw bolt to cooperate with said adjusting nut, said bowl or tray being provided with recesses for said washers.

6. A device of the class specified comprising a glass bowl or tray, a moistening member mounted therein and having a projecting moistening end, said bowl or tray having a cut-away portion to form a shoulder or overhang at one side, a horizontally swinging guide having one end pivotally mounted on said shoulder or overhang and arranged to be swung about said end into position close to the moistening member, a screw bolt on which said guide is pivotally mounted, said screw bolt passing through said overhang and having its head on one side of the same and an adjusting nut on the bolt on the other side of the same, and washers of compressible friction material on the screw bolt on opposite sides of the overhang to cooperate with the bolt head and associating nut.

7. A device of the class specified comprising a glass bowl or tray, a moistening member mounted therein and having a projecting moistening end, said bowl or tray having a cut-away portion to form a shoulder or overhang at one side, a horizontally swinging guide having one end pivotally mounted on said shoulder or overhang and arranged to be swung into position close to the moistening member, a screw bolt on which said guide is pivotally mounted, said screw bolt passing through said overhang and having its head on one side of the same and an adjusting nut on the bolt on the other side of the same, and washers of compressible friction material on the screw bolt on opposite sides of the overhang to cooperate with the bolt head and associating nut, said overhang being provided with recesses for said washers.

FREDERICK A. WATKINS.